United States Patent
Tarsa et al.

(10) Patent No.: US 10,168,467 B2
(45) Date of Patent: Jan. 1, 2019

(54) LUMINAIRES UTILIZING EDGE COUPLING

(71) Applicant: CREE, INC., Durham, NC (US)

(72) Inventors: Eric J. Tarsa, Goleta, CA (US); Hormoz Benjamin, Moorpark, CA (US); John W. Durkee, Raleigh, NC (US); Bernd P. Keller, Santa Barbara, CA (US)

(73) Assignee: CREE, INC., Durham, NC (US)

( * ) Notice: Subject to any disclaimer, the term of this patent is extended or adjusted under 35 U.S.C. 154(b) by 0 days.

(21) Appl. No.: 15/476,052

(22) Filed: Mar. 31, 2017

(65) Prior Publication Data

US 2017/0205567 A1    Jul. 20, 2017

Related U.S. Application Data

(60) Continuation-in-part of application No. 15/277,670, filed on Sep. 27, 2016, and a division of application
(Continued)

(51) Int. Cl.
*F21V 9/00* (2018.01)
*F21V 8/00* (2006.01)
(Continued)

(52) U.S. Cl.
CPC .............. *G02B 6/0078* (2013.01); *F21S 8/00* (2013.01); *G02B 6/002* (2013.01); *G02B 6/009* (2013.01);
(Continued)

(58) Field of Classification Search
CPC .. G02B 6/0078; G02B 6/0016; G02B 6/0031; G02B 6/0083; G02B 6/0085; G02B 6/0088; G02B 6/009
See application file for complete search history.

(56) References Cited

U.S. PATENT DOCUMENTS 4,954,930 A    9/1990 Maegawa et al.
5,005,108 A    4/1991 Pristash
(Continued)

FOREIGN PATENT DOCUMENTS

JP    10-173870    6/1998
JP    H10173870    6/1998
(Continued)

OTHER PUBLICATIONS

Supplementary Extended European Search Report dated Nov. 7, 2017, for European Application No. 14869050.6, Applicant, Cree, Inc., (7 pages).
(Continued)

*Primary Examiner* — Anne M Hines
(74) *Attorney, Agent, or Firm* — McDermott Will & Emery LLP

(57) ABSTRACT

A luminaire includes at least first and second waveguides. The first waveguide has a first coupling surface extending between a first surface and a second surface opposite the first surface, and the second waveguide has a second coupling surface extending between a third surface and a fourth surface opposite the third surface. The first and second coupling surfaces define a coupling cavity. The luminaire further includes at least one light source within the coupling cavity.

10 Claims, 15 Drawing Sheets

Related U.S. Application Data

No. 14/472,035, filed on Aug. 28, 2014, now Pat. No. 9,645,303, and a continuation-in-part of application No. 14/472,064, filed on Aug. 28, 2014, said application No. 15/277,670 is a continuation of application No. 14/472,078, filed on Aug. 28, 2014, application No. 15/476,052, which is a continuation-in-part of application No. PCT/US2014/030017, filed on Mar. 15, 2014, and a continuation-in-part of application No. PCT/US2014/013931, filed on Jan. 30, 2014, and a continuation-in-part of application No. PCT/US2014/013937, filed on Jan. 30, 2014, said application No. 14/472,035 is a continuation-in-part of application No. 14/101,051, filed on Dec. 9, 2013, now Pat. No. 9,366,396, application No. 15/496,052, which is a continuation-in-part of application No. 14/101,129, filed on Dec. 9, 2013, said application No. 14/472,035 is a continuation-in-part of application No. 14/101,132, filed on Dec. 9, 2013, now Pat. No. 9,442,243, application No. 15/476,052, which is a continuation-in-part of application No. 14/101,086, filed on Dec. 9, 2013, now Pat. No. 9,690,029, and a continuation-in-part of application No. 14/101,147, filed on Dec. 9, 2013, now Pat. No. 9,869,432, said application No. 14/472,035 is a continuation-in-part of application No. 14/015,801, filed on Aug. 30, 2013, now Pat. No. 9,291,320, and a continuation-in-part of application No. 13/938,877, filed on Jul. 10, 2013, now Pat. No. 9,389,367, and a continuation-in-part of application No. 13/839,949, filed on Mar. 15, 2013, now Pat. No. 9,581,751, application No. 15/476,052, which is a continuation-in-part of application No. 13/841,074, filed on Mar. 15, 2013, now Pat. No. 9,625,638, said application No. 14/472,035 is a continuation-in-part of application No. 13/842,521, filed on Mar. 15, 2013, now Pat. No. 9,519,095, application No. 15/476,052, which is a continuation-in-part of application No. 13/841,622, filed on Mar. 15, 2013, and a continuation-in-part of application No. 13/840,563, filed on Mar. 15, 2013.

(60) Provisional application No. 62/020,866, filed on Jul. 3, 2014, provisional application No. 61/922,017, filed on Dec. 30, 2013.

(51) Int. Cl.

| | |
|---|---|
| *F21S 8/00* | (2006.01) |
| *F21V 23/00* | (2015.01) |
| *F21W 131/103* | (2006.01) |
| *F21Y 105/00* | (2016.01) |
| *F21Y 113/00* | (2016.01) |
| *F21V 29/76* | (2015.01) |
| *F21Y 101/00* | (2016.01) |
| *F21Y 103/10* | (2016.01) |
| *F21Y 115/10* | (2016.01) |

(52) U.S. Cl.
CPC ......... *G02B 6/0016* (2013.01); *G02B 6/0031* (2013.01); *G02B 6/0083* (2013.01); *G02B 6/0085* (2013.01); *G02B 6/0088* (2013.01); *F21V 23/003* (2013.01); *F21V 29/763* (2015.01); *F21W 2131/103* (2013.01); *F21Y 2101/00* (2013.01); *F21Y 2103/10* (2016.08); *F21Y 2105/00* (2013.01); *F21Y 2113/00* (2013.01); *F21Y 2115/10* (2016.08); *G02B 6/0068* (2013.01); *G02B 6/0073* (2013.01)

(56) References Cited

U.S. PATENT DOCUMENTS

| | | |
|---|---|---|
| 5,026,161 A | 6/1991 | Werner |
| 5,040,098 A | 8/1991 | Tanaka et al. |
| 5,061,404 A | 10/1991 | Wu et al. |
| 5,113,177 A | 5/1992 | Cohen |
| 5,113,472 A | 5/1992 | Gualtieri et al. |
| 5,165,772 A | 11/1992 | Wu |
| 5,171,080 A | 12/1992 | Bathurst |
| 5,175,787 A | 12/1992 | Gualtieri et al. |
| 5,186,865 A | 2/1993 | Wu et al. |
| 5,245,689 A | 9/1993 | Gualtieri |
| 5,295,019 A | 3/1994 | Rapoport |
| 5,309,544 A | 5/1994 | Saxe |
| 5,359,687 A | 10/1994 | McFarland |
| 5,359,691 A | 10/1994 | Tai et al. |
| 5,396,350 A | 3/1995 | Beeson et al. |
| 5,400,224 A | 3/1995 | Dunah et al. |
| 5,428,468 A | 6/1995 | Zimmerman et al. |
| 5,462,700 A | 10/1995 | Beeson et al. |
| 5,481,385 A | 1/1996 | Zimmerman et al. |
| 5,521,726 A | 5/1996 | Zimmerman et al. |
| 5,528,720 A | 6/1996 | Winston et al. |
| 5,555,160 A | 9/1996 | Tawara et al. |
| 5,555,329 A | 9/1996 | Kuper et al. |
| 5,572,411 A | 11/1996 | Watai et al. |
| 5,657,408 A | 8/1997 | Ferm et al. |
| 5,658,066 A | 8/1997 | Hirsch |
| 5,676,457 A | 10/1997 | Simon |
| 5,677,702 A | 10/1997 | Inoue et al. |
| 5,702,176 A | 12/1997 | Engle |
| 5,748,828 A | 5/1998 | Steiner et al. |
| 5,761,355 A | 6/1998 | Kuper et al. |
| 5,771,039 A | 6/1998 | Ditzik |
| 5,806,955 A | 9/1998 | Parkyn, Jr. et al. |
| 5,850,498 A | 12/1998 | Shacklette et al. |
| 5,854,872 A | 12/1998 | Tai |
| 5,914,760 A | 6/1999 | Daiku |
| 5,949,933 A | 9/1999 | Steiner et al. |
| 5,974,214 A | 10/1999 | Shacklette et al. |
| 5,980,054 A | 11/1999 | Fukui et al. |
| 5,999,685 A | 12/1999 | Goto et al. |
| 6,139,176 A | 10/2000 | Hulse et al. |
| 6,155,693 A | 12/2000 | Spiegel et al. |
| 6,161,939 A | 12/2000 | Bansbach |
| 6,206,535 B1 | 3/2001 | Hattori et al. |
| 6,232,592 B1 | 5/2001 | Sugiyama |
| 6,379,017 B2 | 4/2002 | Nakabayashi et al. |
| 6,400,086 B1 | 6/2002 | Huter |
| 6,421,103 B2 | 7/2002 | Yamaguchi |
| 6,473,554 B1 | 10/2002 | Pelka et al. |
| 6,485,157 B2 | 11/2002 | Ohkawa |
| 6,523,986 B1 | 2/2003 | Hoffmann |
| 6,541,720 B2 | 4/2003 | Gerald et al. |
| 6,568,819 B1 | 5/2003 | Yamazaki et al. |
| 6,585,356 B1 | 7/2003 | Ohkawa |
| 6,598,998 B2 | 7/2003 | West et al. |
| 6,612,723 B2 | 9/2003 | Futhey et al. |
| 6,616,290 B2 | 9/2003 | Ohkawa |
| 6,633,722 B1 | 10/2003 | Kohara et al. |
| 6,634,772 B2 | 10/2003 | Yaphe et al. |
| 6,647,199 B1 | 11/2003 | Pelka et al. |
| 6,652,109 B2 | 11/2003 | Nakamura |
| 6,659,628 B2 | 12/2003 | Gomez Del Campo |
| 6,671,452 B2 | 12/2003 | Winston et al. |
| 6,676,284 B1 | 1/2004 | Wynne Willson |
| 6,678,021 B2 | 1/2004 | Ohkawa |
| 6,724,529 B2 | 4/2004 | Sinkoff |
| 6,724,543 B1 | 4/2004 | Chinniah et al. |
| 6,727,965 B1 | 4/2004 | Kubota |
| 6,755,546 B2 | 6/2004 | Ohkawa |
| 6,758,582 B1 | 7/2004 | Hsiao et al. |
| 6,796,676 B2 | 9/2004 | Severtson et al. |
| 6,802,626 B2 | 10/2004 | Belfer et al. |
| 6,802,628 B2 | 10/2004 | Kuo |
| 6,840,656 B2 | 1/2005 | Kuo |
| 6,876,408 B2 | 4/2005 | Yamaguchi |

(56) References Cited

U.S. PATENT DOCUMENTS

| | | |
|---|---|---|
| 6,894,740 B2 | 5/2005 | Ohkawa |
| 6,974,241 B2 | 12/2005 | Hara et al. |
| 6,992,335 B2 | 1/2006 | Ohkawa |
| 7,046,318 B2 | 5/2006 | Yu et al. |
| 7,083,313 B2 | 8/2006 | Smith |
| 7,085,460 B2 | 8/2006 | Leu et al. |
| 7,097,341 B2 | 8/2006 | Tsai |
| 7,118,253 B1 | 10/2006 | Simon |
| 7,168,841 B2 | 1/2007 | Hsieh et al. |
| 7,175,330 B1 | 2/2007 | Chen |
| 7,178,941 B2 | 2/2007 | Roberge et al. |
| 7,179,946 B2 | 2/2007 | Saccomanno et al. |
| 7,182,480 B2 | 2/2007 | Kan |
| 7,192,174 B2 | 3/2007 | Myoung |
| 7,209,628 B2 | 4/2007 | Winston et al. |
| 7,222,995 B1 | 5/2007 | Bayat et al. |
| 7,223,004 B2 | 5/2007 | Chen et al. |
| 7,246,931 B2 | 7/2007 | Hsieh et al. |
| 7,265,800 B2 | 9/2007 | Jagt et al. |
| 7,292,767 B2 | 11/2007 | Cheng |
| 7,559,672 B1 | 7/2009 | Parkyn et al. |
| 7,566,148 B2 | 7/2009 | Noh et al. |
| 7,614,764 B2 | 11/2009 | Williams et al. |
| 7,626,655 B2 | 12/2009 | Yamazaki et al. |
| 7,639,918 B2 | 12/2009 | Sayers et al. |
| 7,724,321 B2 | 5/2010 | Hsieh et al. |
| 7,736,045 B2 | 6/2010 | Yamashita et al. |
| 7,753,551 B2 | 7/2010 | Yaphe et al. |
| 7,760,290 B2 | 7/2010 | Kang et al. |
| 7,775,697 B2 | 8/2010 | Hirano et al. |
| 7,806,581 B2 | 10/2010 | Lee |
| 7,866,871 B2 | 1/2011 | Couzin et al. |
| 7,905,646 B2 | 3/2011 | Adachi et al. |
| 8,052,316 B2 | 11/2011 | Lee |
| 8,054,409 B2 | 11/2011 | Hsieh et al. |
| 8,075,157 B2 | 12/2011 | Zhang et al. |
| 8,192,051 B2 | 6/2012 | Dau et al. |
| 8,198,109 B2 | 6/2012 | Lerman et al. |
| 8,210,716 B2 | 7/2012 | Lerman et al. |
| 8,212,263 B2 | 7/2012 | Bierhuizen et al. |
| 8,220,980 B2 | 7/2012 | Gingrich, III |
| 8,231,258 B2 | 7/2012 | Kim et al. |
| 8,231,259 B2 | 7/2012 | Keller et al. |
| 8,242,518 B2 | 8/2012 | Lerman et al. |
| 8,246,187 B2 | 8/2012 | Cheong et al. |
| 8,314,566 B2 | 11/2012 | Steele et al. |
| 8,317,363 B2 | 11/2012 | Zheng |
| 8,325,292 B2 | 12/2012 | Ouchi et al. |
| 8,338,199 B2 | 12/2012 | Lerman et al. |
| 8,338,839 B2 | 12/2012 | Lerman et al. |
| 8,338,840 B2 | 12/2012 | Lerman et al. |
| 8,338,841 B2 | 12/2012 | Lerman et al. |
| 8,338,842 B2 | 12/2012 | Lerman et al. |
| 8,344,397 B2 | 1/2013 | Lerman et al. |
| 8,369,678 B2 | 2/2013 | Chakmakjian et al. |
| 8,382,354 B2 | 2/2013 | Kim et al. |
| 8,388,173 B2 | 3/2013 | Sloan et al. |
| 8,398,259 B2 | 3/2013 | Kwak et al. |
| 8,398,262 B2 | 3/2013 | Sloan et al. |
| 8,408,737 B2 | 4/2013 | Wright et al. |
| 8,410,726 B2 | 4/2013 | Dau et al. |
| 8,414,154 B2 | 4/2013 | Dau et al. |
| 8,430,536 B1 | 4/2013 | Zhao |
| 8,430,548 B1 | 4/2013 | Kelly et al. |
| 8,434,914 B2 | 5/2013 | Li et al. |
| 8,454,218 B2 | 6/2013 | Wang et al. |
| 8,461,602 B2 | 6/2013 | Lerman et al. |
| 8,506,112 B1 | 8/2013 | Dau et al. |
| 8,567,986 B2 | 10/2013 | Szprengiel et al. |
| 8,598,778 B2 | 12/2013 | Allen et al. |
| 8,602,586 B1 | 12/2013 | Dau et al. |
| 8,724,052 B2 | 5/2014 | Hsieh et al. |
| 8,814,391 B2 | 8/2014 | Koh et al. |
| 2004/0135933 A1 | 7/2004 | Leu et al. |
| 2004/0213003 A1 | 10/2004 | Lauderdale et al. |
| 2004/0240217 A1 | 12/2004 | Rice |
| 2006/0072203 A1 | 4/2006 | Lee |
| 2006/0262521 A1 | 11/2006 | Piepgras et al. |
| 2007/0223247 A1 | 9/2007 | Lee et al. |
| 2008/0192458 A1 | 8/2008 | Li |
| 2010/0046219 A1* | 2/2010 | Pijlman ............. G02B 6/0021 362/235 |
| 2011/0058372 A1 | 3/2011 | Lerman et al. |
| 2011/0063830 A1 | 3/2011 | Narendran et al. |
| 2011/0063838 A1 | 3/2011 | Dau et al. |
| 2011/0163681 A1 | 7/2011 | Dau et al. |
| 2011/0163683 A1 | 7/2011 | Steele et al. |
| 2011/0180818 A1 | 7/2011 | Lerman et al. |
| 2011/0193105 A1 | 8/2011 | Lerman et al. |
| 2011/0193106 A1 | 8/2011 | Lerman et al. |
| 2011/0193114 A1 | 8/2011 | Lerman et al. |
| 2011/0195532 A1 | 8/2011 | Lerman et al. |
| 2011/0198631 A1 | 8/2011 | Lerman et al. |
| 2011/0198632 A1 | 8/2011 | Lerman et al. |
| 2011/0204390 A1 | 8/2011 | Lerman et al. |
| 2011/0204391 A1 | 8/2011 | Lerman et al. |
| 2011/0210861 A1 | 9/2011 | Winton et al. |
| 2011/0228527 A1 | 9/2011 | Van Gorkom et al. |
| 2011/0249467 A1* | 10/2011 | Boonekamp ......... G02B 6/0021 362/555 |
| 2012/0008338 A1 | 1/2012 | Ono et al. |
| 2012/0069579 A1 | 3/2012 | Koh et al. |
| 2012/0250319 A1 | 10/2012 | Dau et al. |
| 2012/0268931 A1 | 10/2012 | Lerman et al. |
| 2012/0268932 A1 | 10/2012 | Lerman et al. |
| 2013/0037838 A1 | 2/2013 | Speier et al. |
| 2013/0038219 A1 | 2/2013 | Dau et al. |
| 2013/0039050 A1 | 2/2013 | Dau et al. |
| 2013/0077298 A1 | 3/2013 | Steele et al. |
| 2013/0201715 A1 | 8/2013 | Dau et al. |
| 2013/0208461 A1 | 8/2013 | Warton et al. |
| 2013/0208495 A1 | 8/2013 | Dau et al. |
| 2013/0214300 A1 | 8/2013 | Lerman et al. |
| 2013/0223057 A1 | 8/2013 | Gassner et al. |
| 2013/0279198 A1 | 10/2013 | Lin et al. |
| 2014/0003041 A1 | 1/2014 | Dau et al. |
| 2014/0211462 A1 | 7/2014 | Keller et al. |

FOREIGN PATENT DOCUMENTS

| | | |
|---|---|---|
| JP | 3093080 | 12/2005 |
| JP | 2005332719 | 12/2005 |
| WO | WO 96/21122 | 7/1996 |
| WO | WO 2008/102655 | 8/2008 |

OTHER PUBLICATIONS

International Search Report and Written Opinion dated Mar. 25, 2015, for International Application No. PCT/US2014/072860; Applicant, Cree, Inc. (14 pages).

* cited by examiner

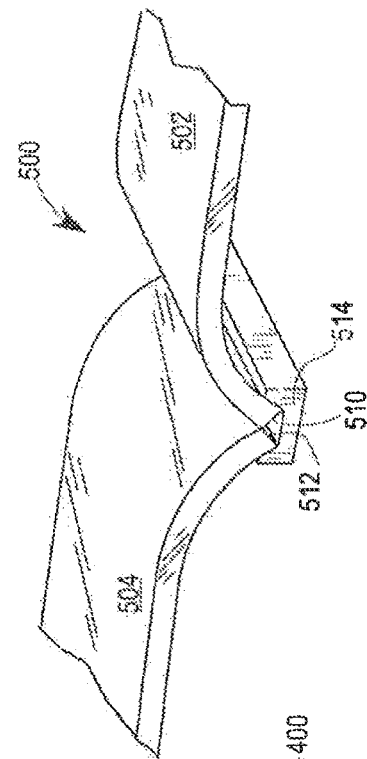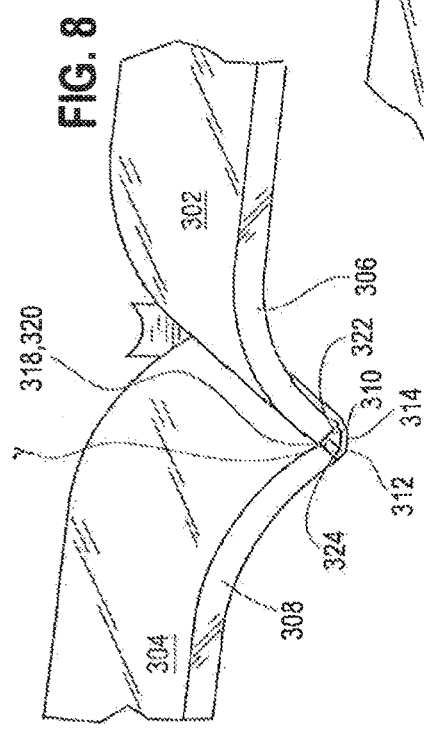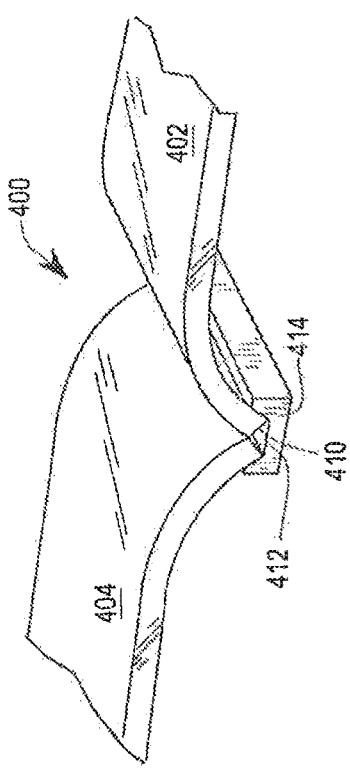

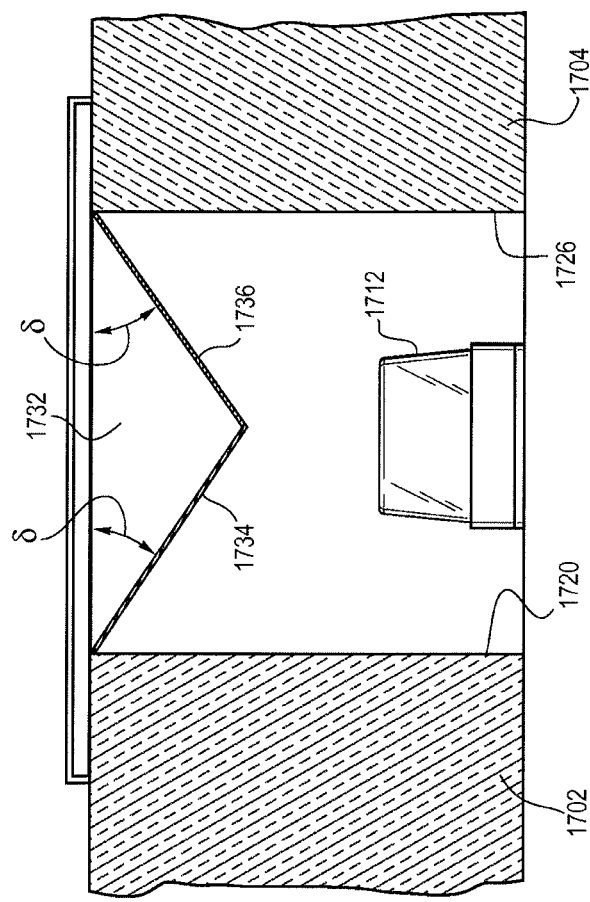

LUMINAIRES UTILIZING EDGE COUPLING

CROSS REFERENCE TO RELATED APPLICATIONS

The present application is a divisional of U.S. patent application Ser. No. 14/472,035 filed on Aug. 28, 2014, entitled "Luminaires Utilizing Edge Coupling", which claims the benefit of U.S. Provisional Patent Application No. 61/922,017, filed Dec. 30, 2013, entitled "Optical Waveguide Bodies and Luminaires Utilizing Same" and U.S. Provisional Patent Application No. 62/020,866, filed Jul. 3, 2014, entitled "Luminaires Utilizing Edge Coupling", all owned by the assignee of the present application, and the disclosures of which are incorporated by reference herein. The present application is a divisional of U.S. patent application Ser. No. 14/472,035 filed on Aug. 28, 2014, entitled "Luminaires Utilizing Edge Coupling", which comprises a continuation-in-part of non-provisional U.S. patent application Ser. No. 14/101,132, filed Dec. 9, 2013, entitled "Waveguide Bodies Including Redirection Features and Methods of Producing Same", and further comprises a continuation-in-part of U.S. patent application Ser. No. 14/101,051, filed Dec. 9, 2013, entitled "Optical Waveguide and Lamp Including Same", and further comprises a continuation-in-part of U.S. patent application Ser. No. 14/015,801, filed Aug. 30, 2013, entitled "Consolidated Troffer", and further comprises a continuation-in-part of U.S. patent application Ser. No. 13/938,877, filed Jul. 10, 2013, entitled "Optical Waveguide and Luminaire Incorporating Same", and further comprises a continuation-in-part of U.S. patent application Ser. No. 13/839,949, filed Mar. 15, 2013, entitled "Optical Waveguide and Lamp Including Same", and further comprises a continuation-in-part of U.S. patent application Ser. No. 13/842,521, filed Mar. 15, 2013, entitled "Optical Waveguides", all owned by the assignee of the present application, and the disclosures of which are incorporated by reference herein. The present application is a divisional of U.S. patent application Ser. No. 14/472,035 filed on Aug. 28, 2014, entitled "Luminaires Utilizing Edge Coupling", and further comprises a continuation-in-part of U.S. patent application Ser. No. 13/841,074, filed Mar. 15, 2013, entitled "Optical Waveguide Body", and further comprises a continuation-in-part of U.S. application Ser. No. 13/841,622, filed Mar. 15, 2013, entitled "Shaped Optical Waveguide Bodies", and further comprises a continuation-in-part of U.S. patent application Ser. No. 13/840,563, filed Mar. 15, 2013, entitled "Optical Waveguide and Luminaire Incorporating Same", and further comprises a continuation-in-part of U.S. patent application Ser. No. 14/101,086, filed Dec. 9, 2013, entitled "Optical Waveguides and Luminaires Incorporating Same", and further comprises a continuation-in-part of U.S. patent application Ser. No. 14/101,147, filed Dec. 9, 2013, entitled "Luminaires Using Waveguide Bodies and Optical Elements", and further comprises a continuation-in-part of U.S. patent application Ser. No. 14/101,129, filed Dec. 9, 2013, entitled "Simplified Low Profile Module With Light Guide For Pendant, Surface Mount, Wall Mount and Stand Alone Luminaires", and further comprises a continuation-in-part of International Application No. PCT/US14/13937, filed Jan. 30, 2014, entitled "Optical Waveguide Bodies and Luminaires Utilizing Same", and further comprises a continuation-in-part of International Application No. PCT/US14/13931, filed Jan. 30, 2014, entitled "Optical Waveguides and Luminaires Incorporating Same", and further comprises a continuation-in-part of International Application No. PCT/US14/30017, filed Mar. 15, 2014, entitled "Optical Waveguide Body", and further comprises a continuation-in-part of U.S. patent application Ser. No. 14/472,064, entitled "Luminaire with Selectable Luminous Intensity Pattern", filed Aug. 28, 2014, all owned by the assignee of the present application, and the disclosures of which are incorporated by reference herein. The present application comprises a continuation-in-part of U.S. patent application Ser. No. 15/277,670, entitled "Waveguide Having Unidirectional Illuminance", filed Sep. 27, 2016, which comprises a continuation of U.S. patent application Ser. No. 14/472,078, entitled "Waveguide Having Unidirectional Illuminance", filed Aug. 28, 2014, all owned by the assignee of the present application, and the disclosures of which are incorporated by reference herein.

REFERENCE REGARDING FEDERALLY SPONSORED RESEARCH OR DEVELOPMENT

Not applicable

SEQUENTIAL LISTING

Not applicable

FIELD OF DISCLOSURE

The present subject matter relates to lighting devices, and more particularly, to a luminaire incorporating waveguides for general illumination.

BACKGROUND

An optical waveguide mixes and directs light emitted by one or more light sources, such as one or more light emitting diodes (LEDs). A typical optical waveguide includes three main components: one or more coupling surfaces or elements, one or more distribution elements, and one or more extraction elements. The coupling component(s) direct light into the distribution element(s), and condition the light to interact with the subsequent components. The one or more distribution elements control how light flows through the waveguide and is dependent on the waveguide geometry and material. The extraction element(s) determine how light is removed by controlling where and in what direction the light exits the waveguide.

When designing a coupling element, the primary considerations are: maximizing the efficiency of light transfer from the source into the waveguide; controlling the location of light injected into the waveguide; and controlling the angular distribution of the light in the waveguide. The coupling element of a waveguide may be comprised of one or more of a number of optical elements, including a 'primary' source optic (such as the lens on an LED component package), one or more intermediate optical elements (such as a lens or array of lenses) interposed between the source and the waveguide coupling surface or surfaces, one or more reflective or scattering surfaces surrounding the sources, and specific optical geometries formed in the waveguide coupling surfaces themselves. Proper design of the elements that comprise the coupling element can provide control over the spatial and angular spread of light within the waveguide (and thus how the light interacts with the extraction elements), maximize the coupling efficiency of light into the waveguide, and improve the mixing of light from various sources within the waveguide (which is particularly important when the color from the sources varies—either by design or due to normal bin-to-bin variation in lighting components). The elements of the waveguide coupling system can use refraction, reflection, total internal reflection, and surface or volume scattering to control the distribution of light injected into the waveguide.

To increase the coupling of light from a light source into a waveguide, it is desirable to maximize the number of light rays emitted by the source(s) that impinge directly upon the waveguide coupling surface. Light rays that are not directly incident on the waveguide from the source must undergo one or more reflections or scattering events prior to reaching the waveguide coupling surface. Each such ray is subject to absorption at each reflection or scattering event, leading to light loss and inefficiencies. Further, each ray that is incident on the coupling surface has a portion that is reflected (Fresnel reflection) and a portion that is transmitted into the waveguide. The percentage that is reflected is smallest when the ray strikes the coupling surface at an angle of incidence relative to the surface normal close to zero (i.e., approximately normal to the surface). The percentage that is reflected is largest when the ray is incident at a large angle relative to the surface normal of the coupling surface (i.e., approximately parallel to the surface). To increase efficiency, the coupling of the light into the waveguide body minimizes the absorbing of light at reflection or scattering events as well as the Fresnel reflection at the coupling surface.

In conventional coupling, a light source, typically emitting a Lambertian distribution of light, is positioned adjacent to the edge of a planar waveguide element. The amount of light that directly strikes the coupling surface of the waveguide in this case is limited due to the wide angular distribution of the source and the relatively small solid angle represented by the adjacent planar surface. To increase the amount of light that directly strikes the coupling surface, a "flat package" component such as the Cree ML-series or MK-series (manufactured and sold by Cree, Inc. of Durham, N.C., the assignee of the present application) may be used. A flat package component is a light source that does not include a primary optic or lens formed about an LED chip. The flat emitting surface of the flat package component may be placed in close proximity to the coupling surface of the waveguide. While this arrangement helps ensure a large portion of the emitted light is directly incident on the waveguide, overall system efficiency generally suffers as flat package components are typically less efficient than components having primary lenses, which facilitate light extraction from the component, improving overall efficiency.

As discussed above, the use of higher-efficiency LEDs having conventional (e.g., predominantly hemispherical or cubic) primary optics results in a limited amount of light that is directly incident on the coupling surface of the waveguide. Such light source(s) are often placed in a reflective channel or cavity to reflect light onto the coupling surface, thereby increasing the amount of light from the source that reaches the waveguide but also reducing overall system efficiency due to the loss incurred at each reflection event. In some luminaires, the waveguide(s) may have coupling surfaces specifically shaped to maximize the amount of light captured at the coupling surfaces. For example, copending application International Application No. PCT/US14/13937, filed Jan. 30, 2014, entitled "Optical Waveguide Bodies and Luminaires Utilizing Same", owned by the assignee of the present application, discloses a coupling cavity design comprising a plurality of ridges and grooves. However, such features can add complexity to the waveguide design and cost to the resulting waveguide-based luminaire.

Alternatively, each LED may be positioned in a cylindrical coupling cavity within the waveguide, and a reflective cap having a cone-shaped plug diverter may be placed at the opposite end of the coupling cavity, as described in copending U.S. patent application Ser. No. 13/839,949, filed Mar. 15, 2013, entitled "Optical Waveguide and Lamp Including Same," U.S. patent application Ser. No. 14/101,086, filed Dec. 9, 2013, entitled "Optical Waveguides and Luminaires Incorporating Same," U.S. patent application Ser. No. 14/101,132, filed Dec. 9, 2013, entitled "Waveguide Bodies Including Redirection Features and Methods of Producing Same," and U.S. patent application Ser. No. 14/101,147, filed Dec. 9, 2013, entitled "Luminaires Using Waveguide Bodies and Optical Elements." This type of coupling configuration can greatly increase the portion of light emitted by the source that is directly incident on the waveguide coupling surface, leading to improved coupling efficiency. However, by its nature such coupling requires discrete sources spaced remotely across a waveguide. Such discrete source placement can have advantages for thermal management of heat generated by the LED sources, but can also lead to increased cost compared to arrangements where the LED sources are all affixed to a single printed circuit board. Additionally, steps must be taken to prevent inadequate color mixing that would otherwise lead to non-uniform appearance in the luminance of the waveguide.

After light has been coupled into the waveguide, it must be guided and conditioned to the locations of extraction. The simplest example is a fiber-optic cable, which is designed to transport light from one end of the cable to another with minimal loss in between. To achieve this, fiber optic cables are only gradually curved and sharp bends in the waveguide are avoided. In accordance with well-known principles of total internal reflection light traveling through a waveguide is reflected back into the waveguide from an outer surface thereof, provided that the incident light does not exceed a critical angle with respect to the surface. Specifically, the light rays continue to travel through the waveguide until such rays strike an index interface surface at a particular angle less than an angle measured with respect to a line normal to the surface point at which the light rays are incident (or, equivalently, until the light rays exceed an angle measured with respect to a line tangent to the surface point at which the light rays are incident) and the light rays escape.

In order for an extraction element to remove light from the waveguide, the light must first contact the feature comprising the element. By appropriately shaping the waveguide surfaces, one can control the flow of light across the extraction feature(s) and thus influence both the position from which light is emitted and the angular distribution of the emitted light. Specifically, the design of the coupling and distribution surfaces, in combination with the spacing (distribution), shape, and other characteristic(s) of the extraction features provides control over the appearance of the waveguide (luminance), its resulting light distribution (illuminance), and system optical efficiency.

Hulse U.S. Pat. No. 5,812,714 discloses a waveguide bend element configured to change a direction of travel of light from a first direction to a second direction. The waveguide bend element includes a collector element that collects light emitted from a light source and directs the light into an input face of the waveguide bend element. Light entering the bend element is reflected internally along an outer surface and exits the element at an output face. The outer surface comprises beveled angular surfaces or a curved surface oriented such that most of the light entering the bend element is internally reflected until the light reaches the output face Parker et al. U.S. Pat. No. 5,613,751 discloses a light emitting panel assembly that comprises a transparent light emitting panel having a light input surface, a light transition area, and one or more light sources. Light sources are preferably embedded or bonded in the light transition area to eliminate any air gaps, thus reducing light loss and maximizing the emitted light. The light transition area may include reflective and/or refractive surfaces around and behind each light source to reflect and/or refract and focus the light more efficiently through the light transition area into the light input surface of the light-emitting panel. A pattern of light extracting deformities, or any change in the shape or geometry of the panel surface, and/or coating that causes a portion of the light to be emitted, may be provided on one or both sides of the panel members. A variable pattern of deformities may break up the light rays such that the internal angle of reflection of a portion of the light rays will be great enough to cause the light rays either to be emitted out of the panel or reflected back through the panel and emitted out of the other side.

Shipman, U.S. Pat. No. 3,532,871 discloses a combination running light reflector having two light sources, each of which, when illuminated, develops light that is directed onto a polished surface of a projection. The light is reflected onto a cone-shaped reflector. The light is transversely reflected into a main body and impinges on prisms that direct the light out of the main body.

Simon U.S. Pat. No. 5,897,201 discloses various embodiments of architectural lighting that is distributed from contained radially collimated light. A quasi-point source develops light that is collimated in a radially outward direction and exit means of distribution optics direct the collimated light out of the optics.

Kelly et al. U.S. Pat. No. 8,430,548 discloses light fixtures that use a variety of light sources, such as an incandescent bulb, a fluorescent tube and multiple LEDs. A volumetric diffuser controls the spatial luminance uniformity and angular spread of light from the light fixture. The volumetric diffuser includes one or more regions of volumetric light scattering particles. The volumetric diffuser may be used in conjunction with a waveguide to extract light.

Dau et al U.S. Pat. No. 8,506,112 discloses illumination devices having multiple light emitting elements, such as LEDs disposed in a row. A collimating optical element receives light developed by the LEDs and a light guide directs the collimated light from the optical element to an optical extractor, which extracts the light.

A.L.P. Lighting Components, Inc. of Niles, Ill., manufactures a waveguide having a wedge shape with a thick end, a narrow end, and two main faces therebetween. Pyramid-shaped extraction features are formed on both main faces. The wedge waveguide is used as an exit sign such that the thick end of the sign is positioned adjacent a ceiling and the narrow end extends downwardly. Light enters the waveguide at the thick end and is directed down and away from the waveguide by the pyramid-shaped extraction features.

In designing waveguide/coupler systems, an important consideration is overall system efficiency, as mentioned above. For example, low-profile LED-based luminaires for general lighting applications have recently been developed (e.g., General Electric's ET series panel troffers) that utilize a string of LED components directed into the edge of a waveguiding element (an "edge-lit" approach). However, such luminaires typically suffer from low efficiency due to losses inherent in coupling light emitted from a predominantly Lambertian emitting source such as a LED component into the narrow edge of a waveguide plane.

Smith U.S. Pat. Nos. 7,083,313 and 7,520,650 discloses a light direction device for use with LEDs. In one embodiment, the light direction device includes a plurality of opposing collimators disposed about a plurality of LEDs on one side of the device. Each collimator collimates light developed by the LEDs and directs the collimated light through output surfaces of the collimators toward angled reflectors disposed on a second side opposite the first side of the device. The collimated light reflects off the reflectors out of from the one side perpendicular thereto. In another embodiment, the collimators are integral with a waveguide having reflective surfaces disposed on a second side of the waveguide, and the collimated light is directed toward the reflective surfaces. The light incident on the reflective surfaces is directed from the one side of the device, as in the one embodiment.

SUMMARY

According to one aspect, a luminaire includes at least first and second waveguides. The first waveguide has a first coupling surface extending between a first surface and a second surface opposite the first surface, and the second waveguide has a second coupling surface extending between a third surface and a fourth surface opposite the third surface. The first and second coupling surfaces define a coupling cavity. The luminaire further includes at least one light source within the coupling cavity.

According to another aspect, a luminaire a luminaire includes first and second waveguides, each waveguide having a coupling surface extending along a length thereof. At least one LED element is carried by a structural member between the first and second coupling surfaces of the respective first and second waveguides.

According to another aspect, a luminaire includes a first waveguide having a first coupling surface extending between opposing surfaces and a second waveguide having a second coupling surface extending between further opposing surfaces. The second coupling surface is spaced apart from the first coupling surface. The luminaire further includes a frame having first and second receptacles for receiving first and second waveguides, respectively. A light source is disposed within the frame between the first and second coupling surfaces of the first and second waveguides, respectively.

Other aspects and advantages will become apparent upon consideration of the following detailed description and the attached drawings wherein like numerals designate like structures throughout the specification.

BRIEF DESCRIPTION OF THE DRAWINGS

FIGS. 8-10 are fragmentary isometric views of further embodiments of luminaires;

FIG. 25 is an enlarged fragmentary view of the coupling cavity of FIG. 23.

DETAILED DESCRIPTION

Figure 1:
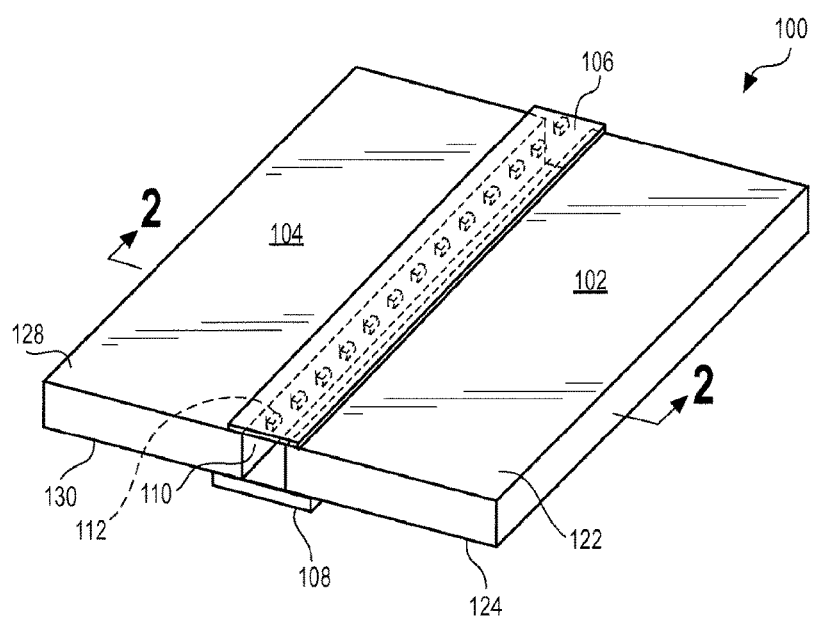
FIG. 1 is an isometric view of an embodiment of a luminaire shown from above.

As shown in the FIGS., the luminaires of the present application utilize edge coupling to couple light from a light source into one or more waveguides. In the drawings, like reference numerals connote like structures throughout. The following examples further illustrate specific embodiments but, of course, should not be construed in any way as the scope of this disclosure.

Figure 2:
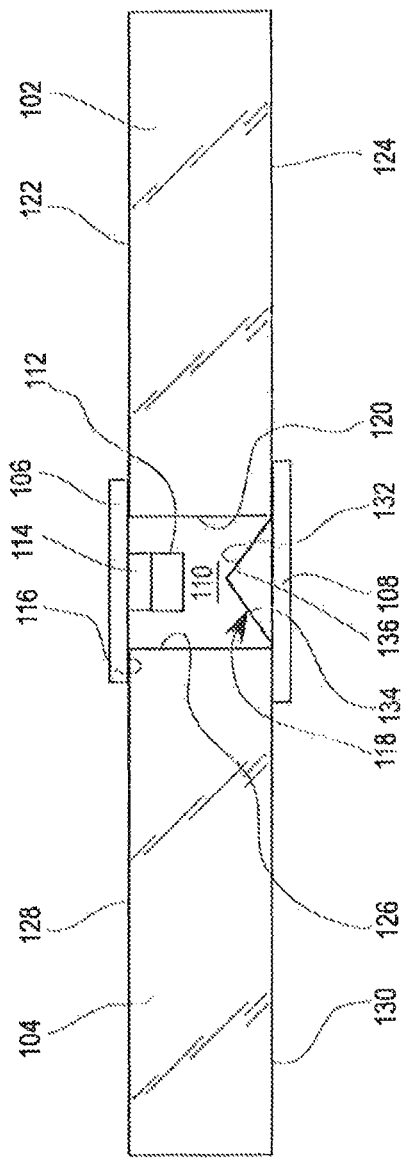
FIG. 2 is a sectional view of the luminaire of FIG. 1 taken generally along lines 2-2 of FIG. 1.

FIG. 1 illustrates a luminaire 100 that utilizes multiple edge coupling and includes a first waveguide 102 and a second waveguide 104. Although not shown, in each of the embodiments disclosed herein a luminaire includes one or more waveguides each having one or more light extraction features to extract light therefrom. If desired, more than two waveguides could be used, each having at least one light extraction feature. The first and second waveguides 102, 104 are disposed between opposing first and second structural members 106, 108 and are spaced apart to form a coupling cavity 110 (FIG. 2). As seen in FIG. 2, a plurality of LEDs 112 is disposed on a printed circuit board 114 mounted on an inner surface 116 of the first structural member 106. The second structural member 108 is disposed opposite the first structural member 106 and includes a light diverter 132 comprising a reflective element 118 opposite the plurality of LEDs 112.

Specifically, the first waveguide 102 has a first coupling surface 120 extending between opposing surfaces 122, 124, and the second waveguide 104 has a second coupling surface 126 extending between further opposing surfaces 128, 130. Each LED 112 extending from the inner surface 116 of the first member 106 adjacent the first and second coupling surfaces 120, 126 produces a near-Lambertian light distribution where some but not all of the light rays are directly incident on the first and second coupling surfaces 120, 126 of the waveguides 102, 104. The reflective element 118 of the second member 108 directs light that is not directly incident on the adjacent coupling surfaces 120, 126 onto the coupling surfaces 120, 126 with a minimum number of reflections. More generally, the light diverter 132 may use reflection, scattering, transmission, refraction, total internal reflection, and/or any combination of methods for re-directing the light onto the waveguide coupling surfaces 120, 126.

In the embodiment shown in FIG. 2, the light diverter 132 has a planar or V-shape formed by first and second faces 134, 136 that extends along the coupling surfaces 120, 126. The light diverter 132 may be extruded aluminum or other metal, or a reflective polymer, or a substantially transparent member with reflective, scattering, refractive, and/or TIR surfaces, and may include a reflective or scattering coating or the like. The light diverter 132 may have other shapes or surfaces as necessary to develop the desired light distribution.

Further, the first and second coupling surfaces 120, 126 of the respective first and second waveguides 102, 104 have a planar surface. In another embodiment, the first and second coupling surfaces 120, 126 may be scalloped along the length of the first and second waveguides 102, 104. Such scallops maximize the amount of light directly incident on the first and second coupling surfaces such that the amount of light refracted into the waveguide 102, 104 is increased and the amount of light reflected off of the coupling surfaces 120, 126 due to Fresnel reflection is decreased. In other embodiments, the first and second coupling surfaces 120, 126 may be planar, curved, and/or piecewise linear approximating a curve. In still other embodiments, the first and second coupling surfaces 120, 126 may incorporate an anti-reflection coating to further improve the coupling of light into the waveguide.

Each LED element or module 112 may be a single white or other color LED, or each may comprise multiple LEDs either mounted separately or together on a single substrate or package to form a module including, for example, at least one phosphor-coated LED either alone or in combination with at least one color LED, such as a green LED, a yellow LED, a red LED, etc. In those cases where a soft white illumination is to be produced, each LED element or module 112 or a plurality of such elements or modules may include one or more blue shifted yellow LEDs and one or more red LEDs. The LEDs may be disposed in different configurations and/or layouts as desired. Different color temperatures and appearances could be produced using other LED combinations, as is known in the art. The luminaire may include LEDs 112 of the same type of phosphor-converted white LED, or any combination of the same or different types of LEDs discussed herein. In some embodiments, a luminaire may include a plurality of groups of LEDs 112, where each group may include LEDs 112 having different colors and/or color temperatures. The groups of LEDs 112 may be separated by dividers 234, as described below, wherein the LEDs 65 are disposed within the coupling cavity. In embodiments having LEDs of the same or similar color, dividers 234 may not be necessary or desired. Further, In one embodiment, the light source may comprise any LED, for example, an MT-G LED incorporating TrueWhite® LED technology or as disclosed in U.S. patent application Ser. No. 13/649,067, filed Oct. 10, 2012, entitled "LED Package with Multiple Element Light Source and Encapsulant Having Planar Surfaces" by Lowes et al., the disclosure of which is hereby incorporated by reference herein, as developed and manufactured by Cree, Inc., the assignee of the present application. If desirable, a side emitting LED disclosed in U.S. Pat. No. 8,541,795, the disclosure of which is incorporated by reference herein, may be utilized inside the waveguide body. In some embodiments, each LED element or module 112 may comprise one or more LEDs disposed vertically within the coupling cavity. In any of the embodiments disclosed herein the LED element(s) or module(s) 112 may have a Lambertian or near-Lambertian light distribution, although preferably each may have a directional emission distribution (e.g., a side emitting distribution), as necessary or desirable to further increase the portion of light directly incident on the first and second coupling surfaces 120, 126, or to modify or control the angular distribution of light within the waveguide. More generally, any Lambertian, near-Lambertian, symmetric, wide angle, preferential-sided, or asymmetric beam pattern LED(s) may be used as the light source.

Figure 3:
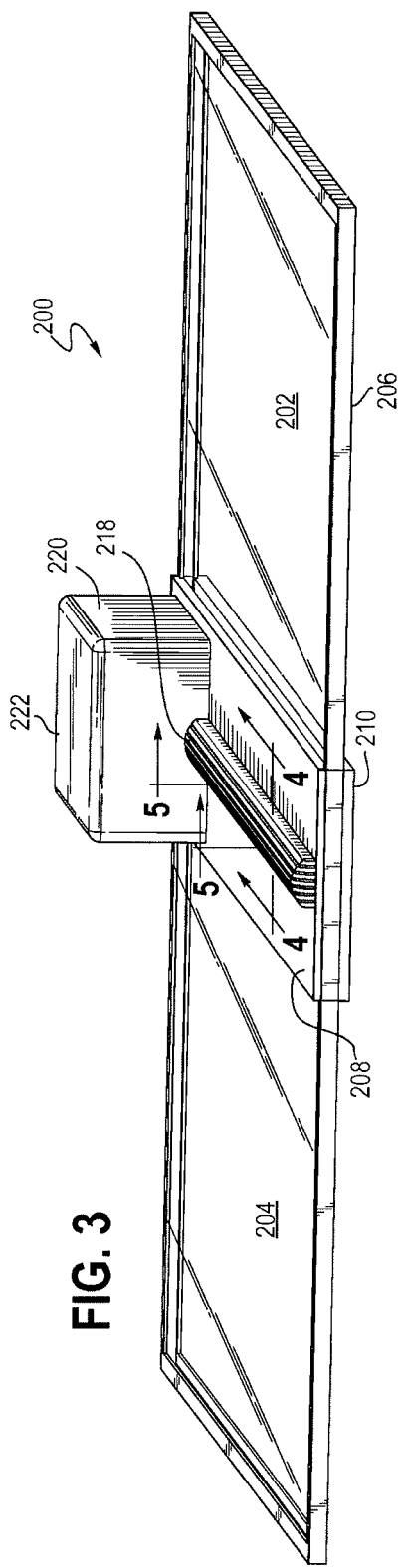
FIG. 3 is an isometric view of a further embodiment of a luminaire shown from above.
Figure 4:
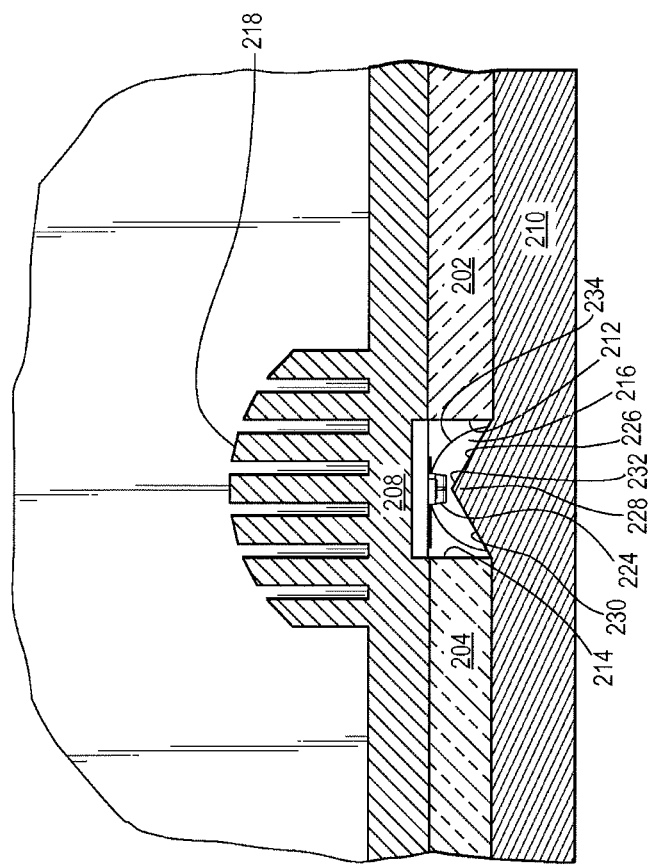
FIG. 4 is a fragmentary sectional view of the luminaire of FIG. 3 taken generally along lines 4-4 of FIG. 3.

Referring to FIG. 3, an alternative embodiment of a luminaire 200 is shown having a first waveguide 202 and a second waveguide 204 positioned in a frame 206. The first and second waveguides 202, 204 are disposed between opposing first and second structural members 208, 210, and first and second coupling surfaces 212, 214 of the respective first and second waveguides 202, 204 are spaced apart to form a coupling cavity 216 (FIG. 4). The first and second structural members 208, 210 extend along the lengths of the first and second waveguides 102, 104. A heat sink 218 having a plurality of parallel plates extends outwardly from the first structural member 208, as shown in FIGS. 3 and 4. A driver circuit 220 disposed on the heat sink 218 is housed within an enclosure 222. The heat sink 218 serves to dissipate heat generated by the LEDs 112 and is, therefore, in thermal contact with the printed circuit board 114 upon which the LEDs 112 are mounted. Further, the heat sink 218 and driver 220 may be disposed on the same side of the frame 206, or on opposite sides thereof.

A plurality of LEDs 224 is disposed within the coupling cavity 216 shown in FIG. 4 along an inner surface of the first structural member 208 opposite the heat sink 218. Each LED 224 produces a Lambertian or near-Lambertian light distribution where some but not all of the light rays are directly incident on the first and second coupling surfaces 212, 214 of the waveguides 202, 204. A reflective element 226 along an inner surface of the second member 210 may include a light diverter 228 to direct light not directly incident on the adjacent coupling surfaces 212, 214 onto the coupling surfaces 212, 214 with a minimum number of reflections. In this embodiment, the light diverter 228 has a V-shape formed by first and second faces 230, 232 extending along the length of the coupling cavity 216. In other embodiments, the light diverter 228 may have a curved, flat or concave shape as desired. In some embodiments, the light diverter 228 may be extruded such that a cross-section thereof is constant along the length of the first and second waveguides 102, 104.

Figure 5:
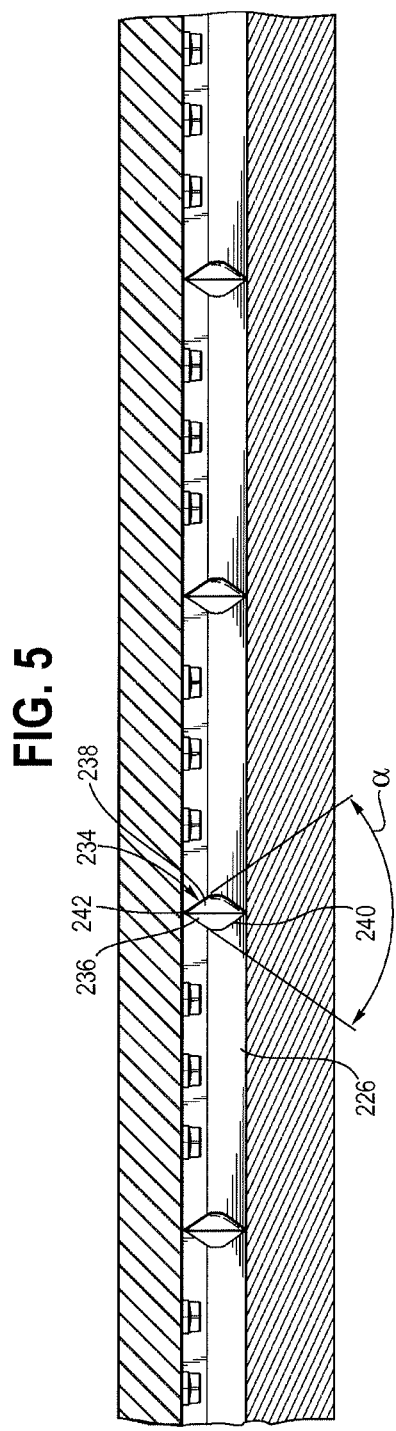
FIG. 5 is a fragmentary sectional view of a coupling cavity of the luminaire of FIG. 3 taken generally along lines 5-5 of FIG. 3.
Figure 6:
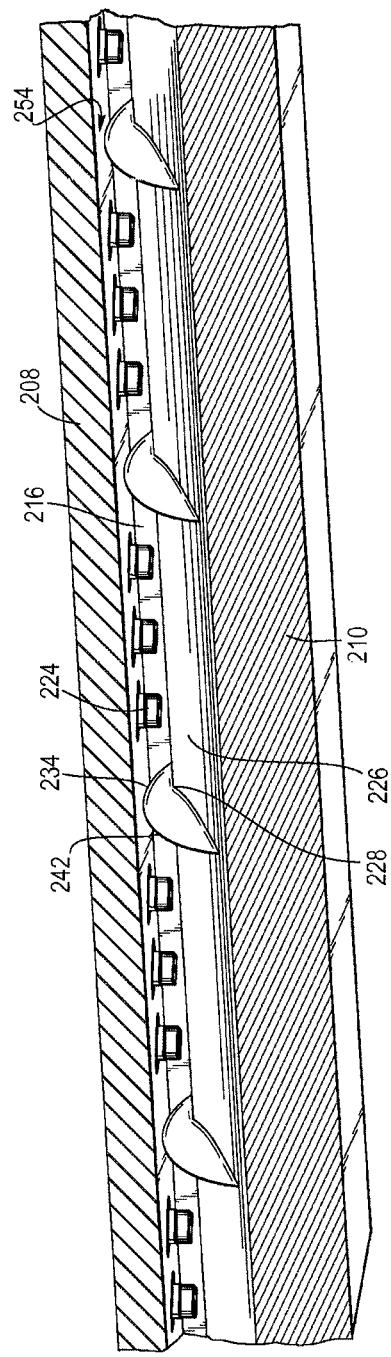
FIG. 6 is an isometric view of the coupling cavity of FIG. 5 from below.

Further, as seen in FIG. 5, the reflective element 226 may further include a plurality of dividers 234 to facilitate the mixing of light from an adjacent LED 112, limit the angle of incidence of light incident on the first and second coupling surfaces 212, 214, reduce interaction and light absorption between LED components 112, etc. The dividers 234 may comprise first and second surfaces 236, 238 that extend outwardly from the reflective element 226. The first and second surfaces 236, 238 are spaced apart at a base 240 on the reflective element 226 and abut one another at an outer edge 242 to form an angle α. In some embodiments, the angle α is approximately 45 degrees, although the angle α may vary depending on the desired mixing of the light and/or coupling of the light into the waveguides 202, 204. Referring to FIG. 6, the outer edge 242 is piecewise linear in shape approximating a semi-circle curved shape, although other outer edge geometries may be desired.

Figure 7:
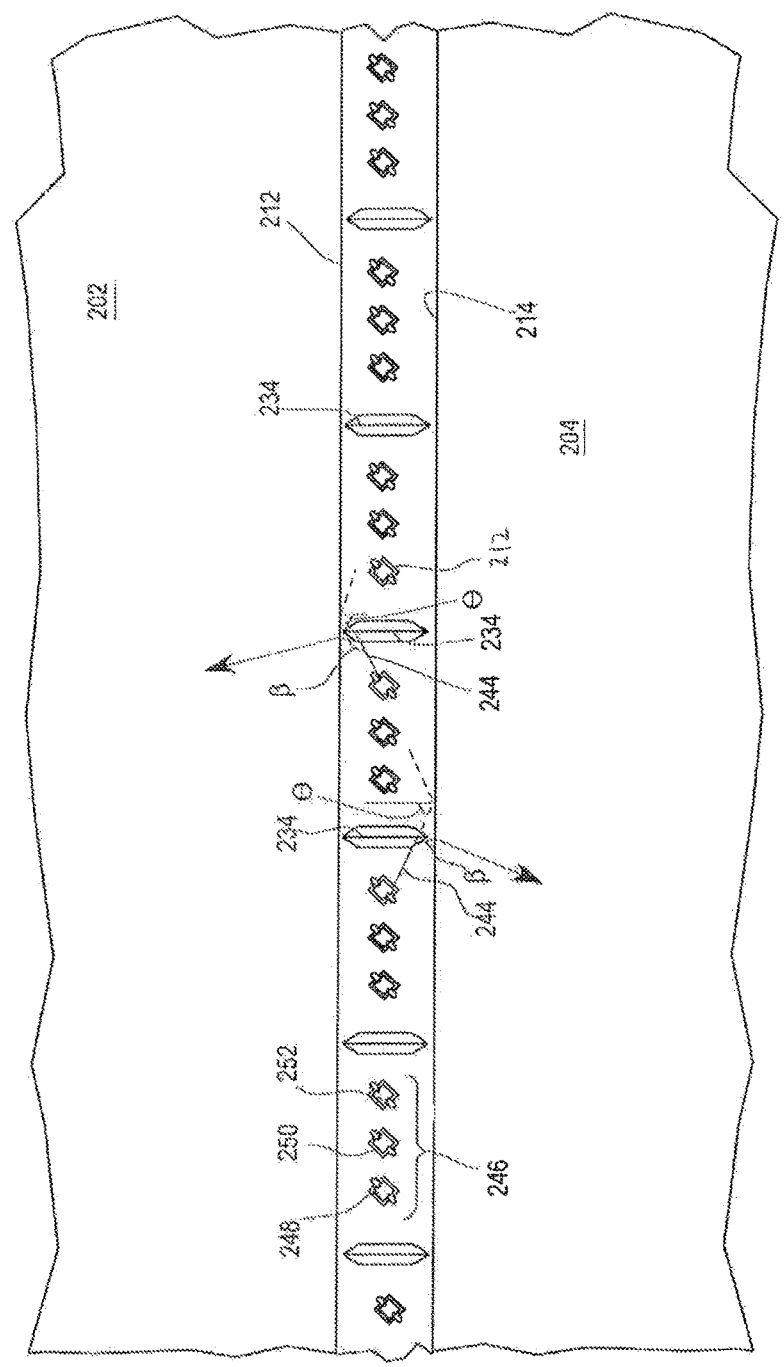
FIG. 7 is a fragmentary plan view of the coupling cavity of the luminaire of FIG. 3.

Referring to FIG. 7, the divider 234 may be employed to minimize the amount of light reflected back into the coupling cavity due to Fresnel reflection. The divider 234 intercepts light rays 244 emitted from an LED that would otherwise strike the coupling surface 212, 214 of the waveguide 202, 204 at a large angle θ relative to the surface normal of the coupling surface, to prevent a substantial portion of such light rays from being reflected back into the coupling cavity 216. Intercepted light 244 is instead directed toward the coupling surfaces 212, 214 of the waveguides 202, 204 at an angle β relative to the surface normal of the coupling surface smaller than angle θ so that a reduced and/or minimized amount of light is reflected back into the coupling cavity 216.

In the example embodiment shown in FIGS. 3-7, the dividers 234 separate the plurality of LEDs 112 into groups 246 of three LEDs. Each group of LEDs may include a first blue-green emitting LED 248, a red emitting LED 250, and a second blue-green emitting LED 252. The light emitted by each LED 248, 250, 252 mixes to form a white light having a high color rendition index. Other colors and/or hues may be produced by various combinations of different LEDs. In applications where the output light is produced by mixing light from two LEDs, it may be preferred to use dividers 234 to separate a plurality of LEDs 112 individually or into groups of two. In applications where the output light is produced by mixing light from four LEDs, the dividers 234 may separate a plurality of LEDs 112 into groups of four, and so on.

Seen best in FIG. 6, a gap 254 may be provided between each divider 234 and the adjacent surfaces of the first structural member 208 and the first and second coupling surfaces 212, 214. Each gap 254 allows for some light to escape from one group 246 of LEDs to an adjacent group 246. The amount of light, if any, that is mixed between groups 246 may be modified in order to produce a desired color, hue, and/or light distribution. In other embodiments, the divider 234 may extend fully to the adjacent surfaces 208, 212, 214 to prevent any light from mixing between adjacent groups 246. In still other embodiments, the gap 254 may be larger or smaller depending on the desired effect. Still further, the divider 234 may be transparent with some reflective surfaces. A transparent divider may use refraction and/or total internal reflection to direct the light rays toward the first and second coupling surfaces of the respective first and second waveguides.

FIG. 8 illustrates a further embodiment of a luminaire 300 utilizing multiple edge coupling and in which a light diverter is omitted. Each waveguide 302, 304 includes a curved coupling section 306, 308 adjacent a coupling surface 310, 312, respectively. A thickness defined by the opposing surfaces is constant through the coupling section 306, 308 to the coupling surface 310, 312. The radii of curvature of the coupling sections 306, 308 of the respective waveguides 302, 304 are selected in accordance with the thickness of the waveguide 302, 304 to provide surfaces that totally internally reflect light. For example, each radius of curvature may be about three to four times the thickness of the waveguide, such that a waveguide having a thickness of approximately 3 mm to approximately 4 mm has a radius of curvature ranging from about 12 mm to about 16 mm. First and second coupling surfaces 310, 312 of respective first and second waveguides 302, 304 are aligned along a length of the luminaire 300. A housing 314 extends along the length of the luminaire 300 adjacent the first and second coupling surfaces 310, 312 to form a coupling cavity 316.

More specifically, the first and second coupling surfaces 310, 312 abut one another along first edges 318, 320 of the coupling surfaces 310, 312. The coupling surfaces 310, 312 diverge from the adjoined first edges 318, 320 to form an angle γ therebetween. In any of the embodiments disclosed herein the coupling surfaces may be disposed at an angle γ therebetween in a range between about zero degrees (i.e., parallel to one another) to about 180 degrees or more, and, more preferably, in a range between about 45 degrees and about 100 degrees, and most preferably in a range between about 80 degrees and about 90 degrees. A plurality of LEDs (not shown) is disposed along the length of the housing 314 within the coupling cavity 316. In contrast to the coupling surfaces 120, 126 of the coupling cavity 110 of FIG. 2, the coupling surfaces 310, 312 of FIG. 8 are angled about the LED (not shown). A greater amount of light emitted from the LEDs is directly incident on the angled coupling surfaces 310, 312, resulting in an increased coupling efficiency as compared to the coupling cavity 110 of FIG. 2. Outer edges of the housing 314 are aligned with second edges 322, 324 of the coupling surfaces 310, 312. The housing 314 has a piecewise linear shape approximating a curve in cross section. The housing 314 may be made of aluminum, polycarbonate, other any suitable material, or combinations thereof. Further, the housing 314 may be manufactured or formed by any method such as extrusion, molding, co-extrusion, or may comprise separate pieces that are bonded, adhered, joined, or otherwise held together.

FIGS. 9 and 10 illustrate still further embodiments of a luminaire 400, 500, respectively, having first and second planar waveguides with curved coupling sections. A housing 414, 514 made of optical grade silicone is overmolded around the second edges of the coupling surfaces to create overlap portions 426, 526. Such overmolding provides the mechanical coupling to hold the waveguides 402 and 404, 502 and 504 together. However, some light is absorbed and/or scattered out of the waveguide at the overlap portions 426, 526, resulting in the loss of light out of the waveguides 402, 404, 502, 504. The housing 414 of the luminaire 400 of FIG. 9 is lambertian (matte) white polycarbonate that is 95% reflecting, 5% absorbing. The housing 514 of luminaire 500 is lambertian (matte) white polycarbonate that is 50% reflecting, 50% absorbing. Other materials having various levels of absorption may be utilized. The housing may be made of aluminum, polycarbonate, other any suitable material, or combinations thereof, and may be manufactured or formed by any method such as extrusion, molding, co-extrusion, overmolding, or may comprise separate pieces that are bonded, adhered, joined, or otherwise held together.

Figure 11:
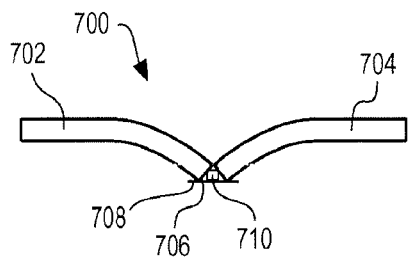
FIG. 11-20 are a fragmentary front elevational view of further embodiments of the luminaire.

Further still, the coupling efficiency of light into the coupling surfaces of the waveguides may be adjusted by varying the surfaces of the coupling cavity. Referring to the luminaire 700 of FIG. 11, waveguides 702, 704 and a printed circuit board (PCB) 708 form a fully enclosed coupling cavity 706. The full enclosure of the LEDs 710 results in a high coupling efficiency. The waveguides 702, 704 may have a constant thickness of approximately 3 mm, although other dimensions, shapes, and curvature may be used. Suitable LEDs may be Cree XQ LEDs manufactured and sold by Cree, Inc., although other types and sizes may be used as desired.

Figure 12:
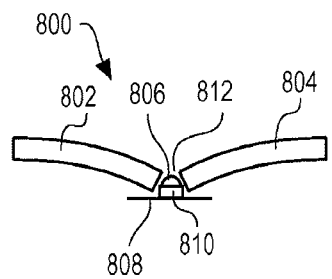
Figure 13:
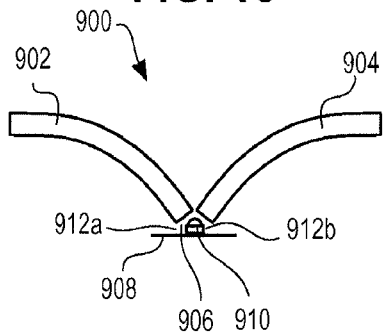

In other embodiments shown in FIGS. 12 and 13, a larger LED 810, 910 may be used, thereby requiring a larger coupling cavity 806, 906. In the luminaire 800 of FIG. 12, a gap 812 is provided between the waveguides 802, 804 in order to accommodate the LED 810. In FIG. 13, gaps 912a, 912b are provided between the waveguides 902, 904 and the PCB 908 to accommodate the LED 910. The waveguides 802, 804, 902, 904 may have a constant thickness of about 3 mm to about 4 mm, although other dimensions, shapes, and curvature may be used. A suitable LED for these embodiments may be Cree XP, XH, or XT LEDs manufactured and sold by Cree, Inc., although other types and sizes may be used as desired.

Figure 14:
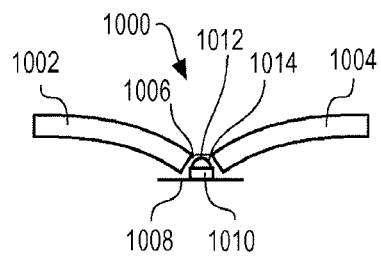
Figure 16:
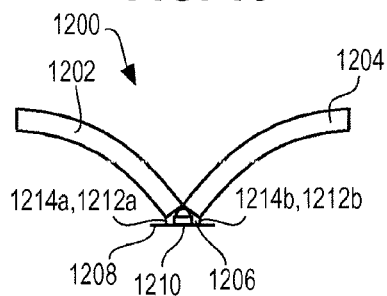

Coupling cavities having gaps at the base thereof have higher coupling efficiencies than coupling cavities having gaps above the LED. Such gaps may be left exposed or may be enclosed with a separate optical layer. Referring to FIG. 14, a reflective element 1014 at the gap 1012 above the LED 1010 directs light into the waveguides 1002, 1004. The luminaire 1200 of FIG. 16 shows reflective elements 1214a, 1214b at gaps 1212a, 1212b at the base of the coupling cavity 1206. The reflective element may be metallic or a plastic painted with a reflective coating, or other similar material.

Figure 15:
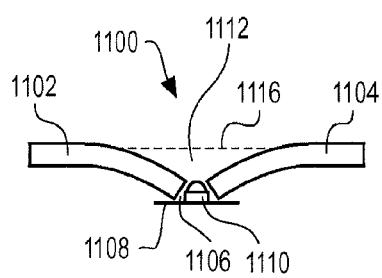
Figure 17:
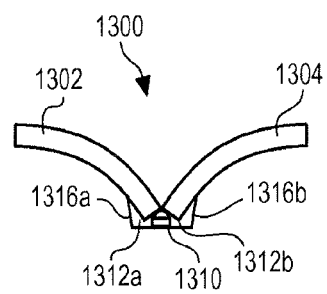

In some embodiments, it may be desired to emit light adjacent the coupling cavity. A transmitting layer may be disposed at or spaced apart from the gap, or spaced apart from the light source(s) at a particular distance to produce a desired appearance having specific color and/or source mixing. FIG. 15 illustrates a luminaire 1100 having a transmissive element 1116 at the gap 1112 above the LED 1110 to control the direction and appearance of light passing through the gap 1110. The luminaire 1300 of FIG. 17 includes transmissive lenses 1316a, 1316b at gaps 1312a, 1312b at the base of the coupling cavity 1306. The transmitting layer may be roughened acrylic, polycarbonate, glass, silicone, or a similar material.

Figure 18:
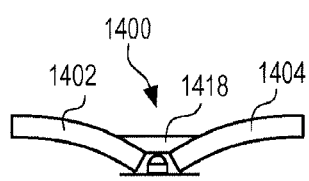
Figure 19:
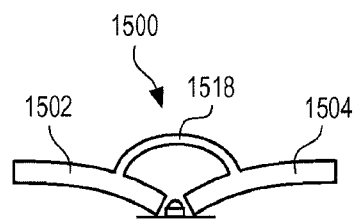
Figure 20:
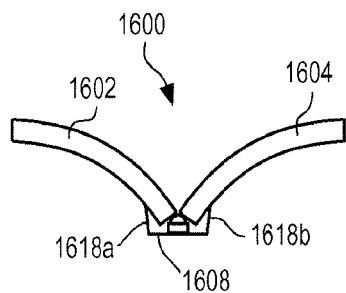

Such separate optical elements may be used to secure the waveguides and PCB relative to one another. The optical layers 1418, 1518 of the respective luminaires 1400, 1500 of respective FIGS. 18 and 19 bond or otherwise secure the waveguides 1402 and 1404, 1502 and 1504 together. Further, the optical layers 1618a, 1618b of the luminaire 1600 of FIG. 20 secure the waveguides 1602, 1604 to the PCB 1608.

Such optical elements may be mounted to the coupling cavity through various methods such as overmolding, the use of adhesives, the use of mechanical features, co-extrusion, other methods, and combinations thereof. Such mounting methods may also be applied to luminaires having fully enclosed coupling cavities.

Figure 21:
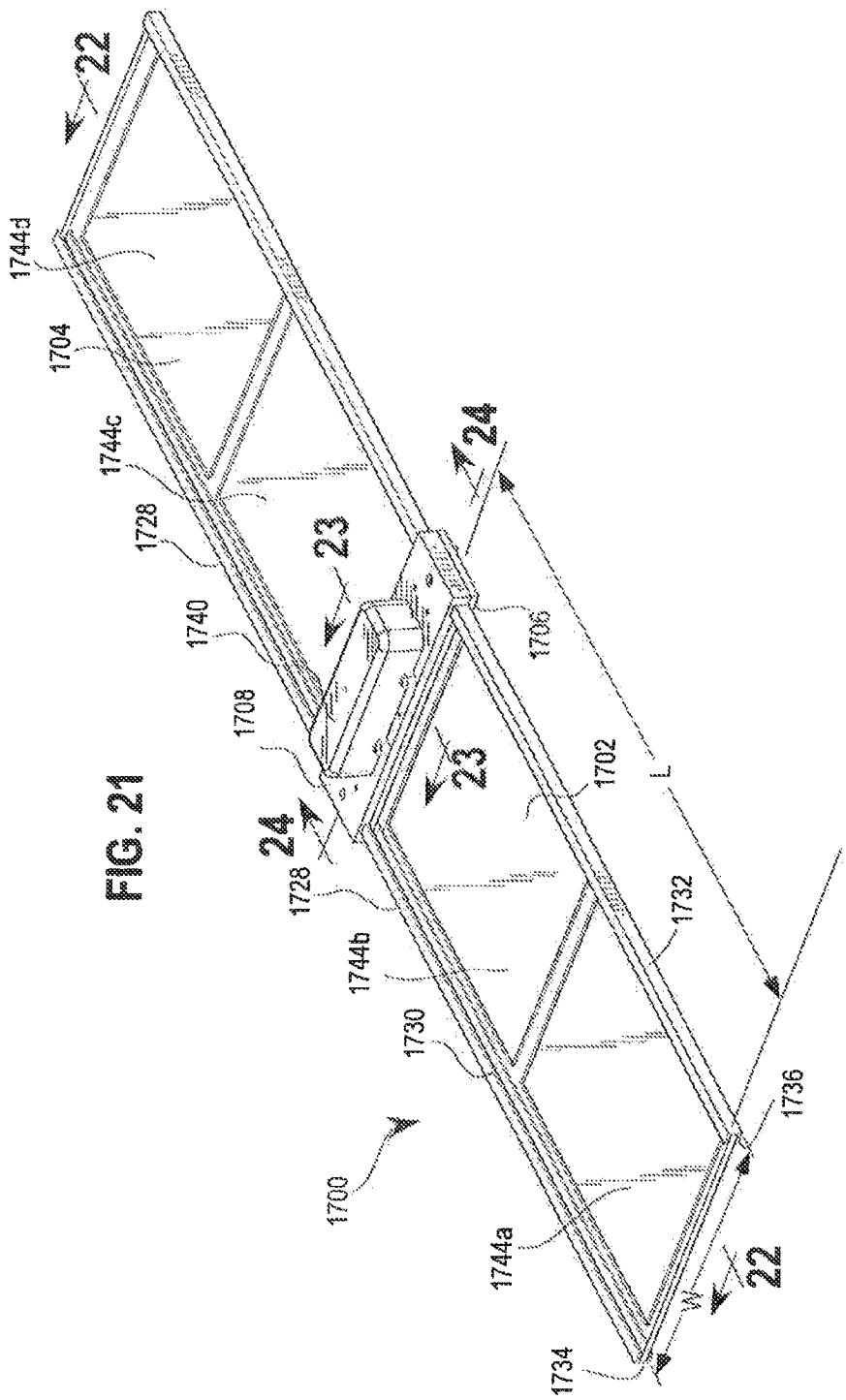
FIG. 21 is an isometric view of a further embodiment of a luminaire shown from above.
Figure 22:
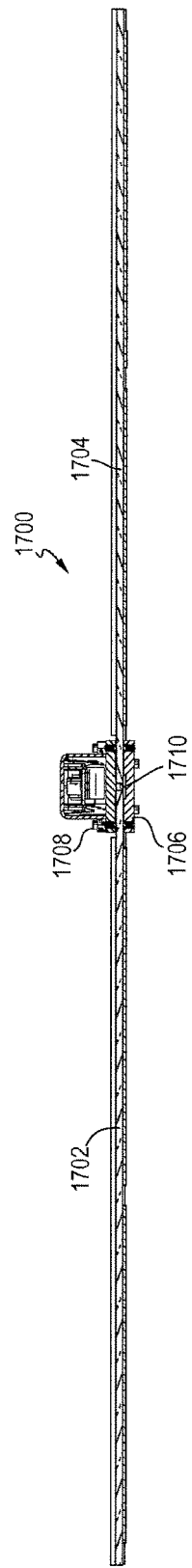
FIG. 22 is a sectional view of the luminaire of FIG. 21 taken generally along the lines 22-22 of FIG. 21.
Figure 23:
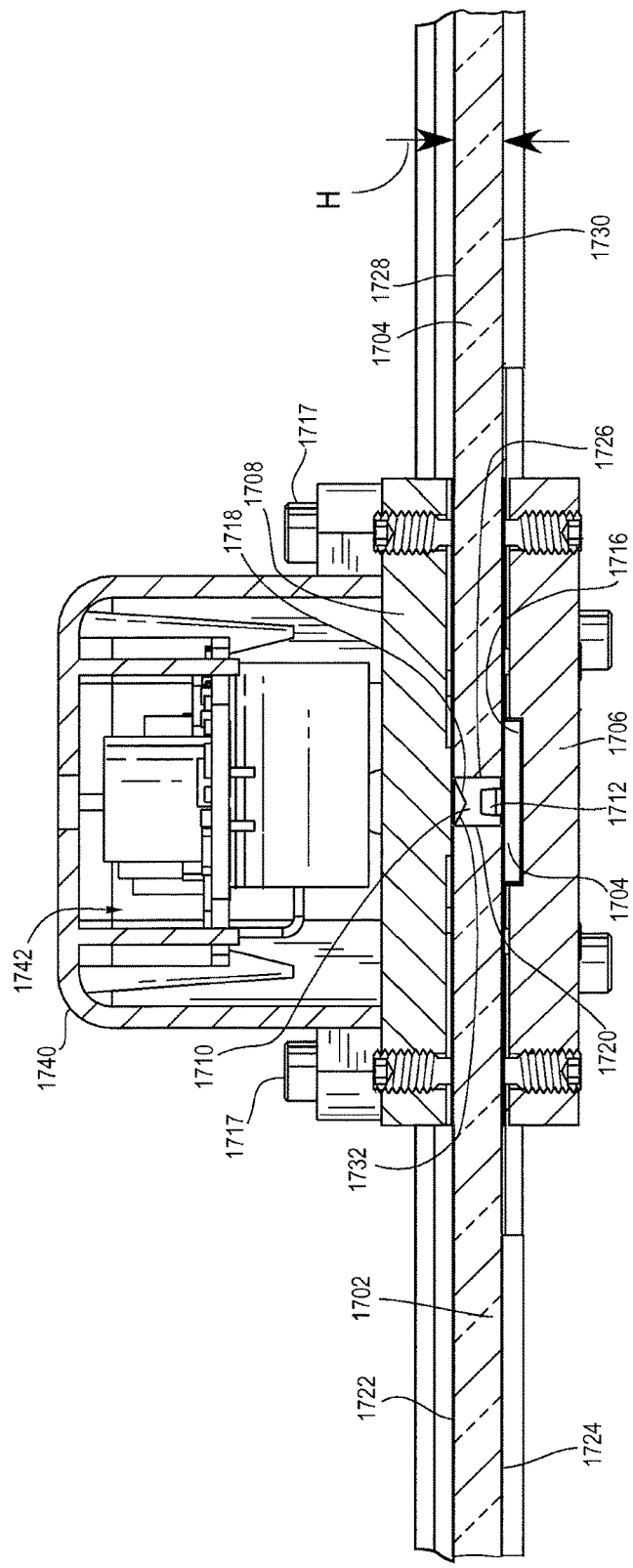
FIG. 23 is an enlarged fragmentary sectional view of the coupling cavity of the luminaire of FIG. 22.
Figure 24:
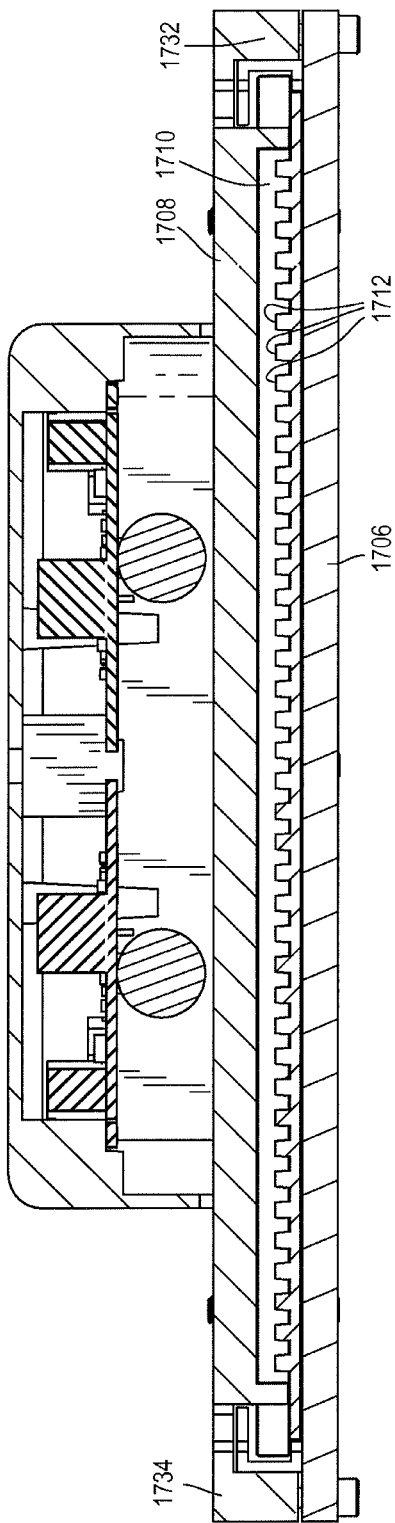
FIG. 24 is a sectional view of the luminaire taken generally along the lines 24-24 of FIG. 21.

FIGS. 21-25 illustrate a further luminaire 1700 that utilizes multiple edge coupling. Referring first to FIGS. 21-23, a first waveguide 1702 and a second waveguide 1704 are disposed between opposing first and second structural members 1706, 1708 and are spaced apart to form a coupling cavity 1710 best seen in FIGS. 23 and 25. As seen in FIGS. 23 and 24, a plurality of LEDs 1712 is disposed on a printed circuit board 1714 mounted on an inner surface 1716 of the first structural member 1706. The second structural member 1708 is disposed opposite the first structural member 1706 and is joined thereto by fasteners 1717. Each waveguide has a length L (FIG. 21), a width W (FIG. 21), and a height H (FIG. 23). In the illustrated embodiment, the first and second waveguides 1702, 1704 are identical, although this need not be the case, and the length L, width H, and height H of the first and second waveguides 1702, 1704 are about 220 mm, 270 mm, and 4.5 mm, respectively. In other embodiments, a luminaire may include a greater or lesser number of identical or non-identical waveguides having the same or different sizes and/or shapes. Further, the coupling cavity 1710 has a length Lc along which the plurality of LEDs is disposed. The second structural member 1708 includes a light diverter 1732 comprising a reflective element 1718 opposite the plurality of LEDs 1712.

The first waveguide 1702 has a first coupling surface 1720 extending between opposing surfaces 1722, 1724, and the second waveguide 1704 has a second coupling surface 1726 extending between further opposing surfaces 1728, 1730. Each LED 1712 extending from the inner surface 1716 of the first member 1706 adjacent the first and second coupling surfaces 1720, 1726 produces a near-Lambertian light distribution where some but not all of the light rays are directly incident on the first and second coupling surfaces 1720, 1726 of the waveguides 1702, 1704. The light diverter 1732 directs light not directly incident on the adjacent coupling surfaces 1720, 1726 onto the coupling surfaces 1720, 1726 with a minimum number of reflections. As in the previous embodiment the light diverter 1732 may use reflection, scattering, transmission, refraction, total internal reflection, and/or any combination of methods for re-directing the light onto the waveguide coupling surfaces 1720, 1726.

In the embodiment shown in FIGS. 21-25, the light diverter 1732 has a V-shape formed by first and second faces 1734, 1736 (FIG. 25) and extends along the widths of the first and second waveguides 1702, 1704. The light diverter 1732 may be extruded aluminum or other metal, or a reflective polymer, or a substantially transparent member with reflective, scattering, refractive, and/or TIR surfaces, and may include a reflective or scattering coating or the like. The light diverter 1732 may have other shapes or surfaces as necessary to develop the desired light distribution.

A housing 1740 is disposed atop the second structural member 1708 and a drive circuit 1742 is disposed in the housing 1740 (FIG. 23). Further, light extraction features are located in four areas 1744a-1744d (FIG. 21) on upper and/or lower surfaces of the waveguides 1702, 1704.

Simulations were performed modeling light diverters having various geometries and coatings/materials and with different spacings between waveguides. Specifically, with reference to FIG. 25, light diverters having different side angles δ and having either specular (mirror-like) reflectors and Lambertian (scattering) reflectors together with waveguide spacings of 4 mm and 7 mm were modeled. In each case, the smaller (4 mm) waveguide spacing yielded higher coupling efficiencies. The best results were obtained at a waveguide spacing of 4 mm and a Specular angled reflector with a 30 degree corner angle δ. In the Lambertian (scattering) reflector case, the coupling efficiency was found to be nearly independent of reflector angle, due primarily to the omnidirectional nature of Lambertian scattering. The following table specifies the results of the simulation:

| | LAMBERTIAN | | | |
|---|---|---|---|---|
| | 4 mm Waveguide Spacing | | 7 mm Waveguide Spacing | |
| ANGLE δ | Coupling Efficiency | Absorption by PCB | Coupling Efficiency | Absorption by PCB |
| 0° | 91.3% | 2.7% | 84.7% | 5.4% |
| 10° | 91.4% | 2.7% | 84.7% | 5.4% |
| 20° | 91.5% | 2.6% | 84.8% | 5.3% |
| 30° | 91.6% | 2.5% | 85.0% | 5.0% |
| 40° | 91.8% | 2.3% | 84.9% | 4.6% |
| 50° | 91.9% | 2.1% | | |

| | SPECULAR | | | |
|---|---|---|---|---|
| | 4 mm Waveguide Spacing | | 7 mm Waveguide Spacing | |
| ANGLE δ | Coupling Efficiency | Absorption by PCB | Coupling Efficiency | Absorption by PCB |
| 0° | 89.6% | 3.7% | 83.8% | 6.0% |
| 10° | 92.4% | 2.1% | 87.5% | 4.0% |
| 20° | 93.7% | 1.3% | 90.2% | 2.4% |
| 30° | 94.0% | 1.1% | 90.9% | 1.7% |
| 40° | 93.7% | 1.1% | 90.5% | 1.7% |
| 50° | 93.7% | 1.1% | | |

In any of the embodiments disclosed herein, and, in general, any suitable specular or Lambertian scattering surface with corner angles between about zero and about 70 degrees could be used, with corner angles between about zero degrees and about 60 degrees for Lambertian reflectors and between 10 degrees and 60 degrees for specular reflectors being more preferred and corner angles between about 20 and about 50 degrees being most preferred, particularly for specular reflectors.

In any of the embodiments disclosed herein, it should be noted that the corner angles δ could be equal or unequal. Also in any of the embodiments disclosed herein, the LEDs need not be centered under the center of the light diverter, but may be offset with respect thereto. Still further, in any of the embodiments disclosed herein, the light diverter may include any number of light diverting surfaces, each of which may comprise a flat surface (i.e., planar surface), a curved surface, a piecewise planar surface, or another shaped surface, and/or any combination thereof. Waveguide spacing distance in any of the embodiments disclosed herein preferably ranges between the minimum spacing distance required to accommodate the LEDs up to about 12 mm, with distance ranges between about 2 mm and about 10 mm being more preferred and spacing distances between 4 mm and about 7 mm being most preferred. Also, in any of the embodiments disclosed herein, the coupling surfaces may be parallel, as seen in FIG. 25, pr the coupling surfaces may be inclined relative to one another at an angle γ therebetween regardless of whether a light diverter is employed. In addition, in any of the embodiments disclosed herein, each coupling surface may comprise any number of surfaces, each of which may be a flat surface (i.e., planar surface), a curved surface, a piecewise planar surface, or another shaped surface, and/or any combination thereof. Still further, in any of the embodiments disclosed herein, some or all of the LEDs may be equally or unequally spaced from the coupling surfaces.

Any of the embodiments disclosed herein may include a power circuit having a buck regulator, a boost regulator, a buck-boost regulator, a SEPIC power supply, or the like, and may comprise a driver circuit as disclosed in U.S. patent application Ser. No. 14/291,829, filed May 30, 2014, entitled "High Efficiency Driver Circuit with Fast Response" by Hu et al., or U.S. patent application Ser. No. 14/292,001, filed May 30, 2014, entitled "SEPIC Driver Circuit with Low Input Current Ripple" by Hu et al., incorporated by reference herein. The circuit may further be used with light control circuitry that controls color temperature of any of the embodiments disclosed herein in accordance with user input such as disclosed in U.S. patent application Ser. No. 14/292,286, filed May 30, 2014, entitled "Lighting Fixture Providing Variable CCT" by Pope et al. incorporated by reference herein.

Further, any of the embodiments disclosed herein may include one or more communication components forming a part of the light control circuitry, such as an RF antenna that senses RF energy. The communication components may be included, for example, to allow the luminaire to communicate with other luminaires and/or with an external wireless controller, such as disclosed in U.S. patent application Ser. No. 13/782,040, filed Mar. 1, 2013, entitled "Lighting Fixture for Distributed Control" or U.S. provisional application No. 61/932,058, filed Jan. 27, 2014, entitled "Enhanced Network Lighting" both owned by the assignee of the present application and the disclosures of which are incorporated by reference herein. More generally, the control circuitry includes at least one of a network component, an RF component, a control component, and a sensor. The sensor, such as a knob-shaped sensor, may provide an indication of ambient lighting levels thereto and/or occupancy within the room or illuminated area. Such sensor may be integrated into the light control circuitry.

In any of the embodiments disclosed herein the material(s) of the waveguides preferably comprise optical grade materials that exhibit TIR characteristics including, but not limited to, one or more of acrylic, air, polycarbonate, molded silicone, glass, and/or cyclic olefin copolymers, and combinations thereof, possibly in a layered arrangement, to achieve a desired effect and/or appearance.

INDUSTRIAL APPLICABILITY

At least some of the luminaires disclosed herein are particularly adapted for use in installations, such as, outdoor products (e.g., streetlights, high-bay lights, canopy lights), and indoor products (e.g., downlights, troffers, a lay-in or drop-in application, a surface mount application onto a wall or ceiling, etc.) preferably requiring a total luminaire output of at least about 100 lumens or greater, and, in some embodiments, a total luminaire output of at least about 3,000 lumens, and in other embodiments, a total lumen output of about 10,000 lumens to about 20,000 lumens. For example, a total lumen output of up to 10,000 lumens may be desired in some industrial and business lighting applications such as warehouse lighting. Further, the luminaires disclosed herein preferably have a color temperature of between about 2500 degrees Kelvin and about 6200 degrees Kelvin, and, in some embodiments, between about 2500 degrees Kelvin and about 5000 degrees Kelvin, and, in other embodiments, about 2700 or 3500 degrees Kelvin. Also, at least some of the luminaires disclosed herein preferably exhibit an efficacy of at least about 80 lumens per watt, more preferably at least about 100, and most preferably 120 lumens per watt. Additionally, at least some of the luminaires disclosed herein preferably exhibit an overall efficiency (i.e., light extracted out of the waveguide divided by light injected into the waveguide) of at least about 70 percent, preferably, at least about 80 percent, and most preferably, at least about 90 percent. A color rendition index (CRI) of at least about 80 is preferably attained by at least some of the luminaires disclosed herein, with a CRI of at least about 88 being more preferable, and at least about 90 being most preferable. Some luminaires exhibit a CRI of at least about 90 while maintaining a relatively high efficiency. Any desired particular output light distribution, such as a butterfly light distribution, could be achieved, including up and down light distributions or up only or down only distributions, etc.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the embodiments are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure. No language in the specification should be construed as indicating any element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

We claim:

1. A luminaire, comprising:
first and second waveguides comprising first and second coupling surfaces, respectively, extending along a length dimension thereof; and
at least one LED element carried by a structural member between the first and second coupling surfaces of the respective first and second waveguides, wherein each coupling surface comprises a first edge and a second edge opposite the first edge, wherein the structural member is disposed adjacent to the second edges of the first and second coupling surfaces, wherein the structural member supports the first and second waveguides, and wherein the structural member comprises optical grade silicone.

2. The luminaire of claim 1, wherein at least one of the coupling surfaces is scalloped.

3. The luminaire of claim 1, wherein at least one of the coupling surfaces is textured.

4. The luminaire of claim 1, wherein the structural member is overmolded onto the second edges of the first and second coupling surfaces of the respective first and second waveguides.

5. The luminaire of claim 1, wherein the structural member comprises a piece-wise linear shape to approximate a concave curve relative to the coupling surfaces of the waveguides.

6. The luminaire of claim 1, wherein the luminaire exhibits an overall efficiency of at least 90%.

7. A luminaire, comprising:
a first waveguide comprising a first coupling surface extending between opposing surfaces;
a second waveguide comprising a second coupling surface extending between further opposing surfaces, wherein the second coupling surface is spaced apart from the first coupling surface;
a frame comprising first and second receptacles for receiving the first and second waveguides, respectively; and
a light source disposed within the frame between the first and second coupling surfaces of the first and second waveguides, respectively, wherein the frame further comprises a first structural member and a second structural member, and wherein the first and second coupling surfaces of the first and second waveguides are disposed between the first and second structural members.

8. The luminaire of claim 7, wherein the light source is carried by the first structural member.

9. The luminaire of claim 8, further comprising a plurality of dividers extending from the first member toward the second structural member, the first coupling surface, and the second coupling surface.

10. The luminaire of claim 7, wherein a plurality of extraction features are disposed on at least one of the opposing surfaces of the first and second waveguides.

* * * * *